United States Patent
Dampier (10) Patent No.: US 6,511,773 B1
(45) Date of Patent: Jan. 28, 2003

(54) LITHIUM RECHARGEABLE INORGANIC ELECTROLYTE CELL

(75) Inventor: Frederick W. Dampier, Watertown, MA (US)

(73) Assignee: Lithium Energy Associates, Inc., Waltham, MA (US)

(*) Notice: Subject to any disclaimer, the term of this patent is extended or adjusted under 35 U.S.C. 154(b) by 83 days.

(21) Appl. No.: 09/608,547

(22) Filed: Jun. 30, 2000

(51) Int. Cl.$^7$ .............................................. H01M 10/24
(52) U.S. Cl. .................. 429/231.95; 429/346; 429/188; 320/124
(58) Field of Search ........................... 429/231.95, 220, 429/188, 346; 320/124, 127, 130, 131

(56) References Cited

U.S. PATENT DOCUMENTS

| | | | |
|---|---|---|---|
| 3,567,515 A | 3/1971 | Maricle et al. | 136/6 |
| 4,139,680 A | 2/1979 | Schlaikjer | 429/50 |
| 4,331,743 A | 5/1982 | Dey et al. | 429/50 |
| 4,513,067 A * | 4/1985 | Kuo et al. | 429/101 |
| 4,515,875 A * | 5/1985 | Bowden et al. | 429/196 |
| 4,863,815 A | 9/1989 | Chang et al. | 429/94 |
| 4,891,281 A * | 1/1990 | Kuo et al. | 429/105 |
| 5,213,914 A | 5/1993 | Heitbaum et al. | 429/197 |
| 5,601,951 A | 2/1997 | Johnson et al. | 429/218 |
| 5,656,391 A | 8/1997 | Hambitzer et al. | 429/162 |
| 6,043,631 A | 3/2000 | Tsenter | 320/148 |
| 6,203,947 B1 * | 3/2001 | Peled et al. | 429/231.95 |
| H1983 H * | 8/2001 | Foster | 429/112 |
| 6,274,271 B1 * | 8/2001 | Koshiba et al. | 429/231.1 |

OTHER PUBLICATIONS

Hambitzer et al., "Rechargeable Lithium Battery With Inorganic Electrolyte", Proceedings of the 37$^{th}$ Power Sources Conference, pp 203–207, Cherry Hill, New Jersey, (1996).
Hossian, S., "Handbook of Batteries", 2$^{nd}$ Edition, pp 36.51–36.58, McGraw–Hill Inc, (1995).
Dey et al., "Inorganic Electrolyte Li/CuC12 Rechargeable Cell", Journal of Electrochemical Society, 136:1618, (1989).

* cited by examiner

Primary Examiner—Patrick Ryan
Assistant Examiner—M. Wills
(74) Attorney, Agent, or Firm—Weingarten, Schurgin, Gagnebin & Lebovici LLP (57) ABSTRACT

A rechargeable cell with an alkali or alkaline earth metal electrode with a coulombic capacity about the same as a metal halide electrode such as $CuCl_2$, $CuBr_2$, and the like, or a metal oxide positive electrode such as $LiCoO_2$, $MnO_2$ and the like or a carbonaceous positive electrode and a sulfur dioxide electrolyte solvent containing a salt that produces a halogen and/or a Lewis acid on overcharge is disclosed. On most discharges, the active metal of the negative electrode is anodically dissolved and any dendrites are anodically dissolved or electrically isolated and scavenged. About every 4 to 50 cycles, the cell is overdischarged in reversal to reduce the state of charge of the positive electrode relative to the negative electrode and compensate for undercharging of the negative electrode during recycling.

20 Claims, 6 Drawing Sheets

LITHIUM RECHARGEABLE INORGANIC ELECTROLYTE CELL

STATEMENT REGARDING FEDERALLY SPONSORED RESEARCH OR DEVELOPMENT

This invention was made with U.S. Government support under Contract F33615-97-C-2706 awarded by the Department of the Air Force. Therefore, the U.S. Government has certain rights in this invention.

CROSS REFERENCE TO RELATED APPLICATIONS

N/A

BACKGROUND OF THE INVENTION

This invention relates to rechargeable cells with alkali or alkaline earth metal or metal-ion negative electrodes, particularly lithium or lithium-ion, and sulfur dioxide based electrolytes, and specifically to the design and methods of electrically operating such cells to improve the recycling life, reliability and electrical performance.

The improvement of lithium rechargeable batteries has been a topic of investigation since the early 1960's. Even so, the attainment of 200 deep cycles was not possible until the 1980's. The two primary problems were: (1) lithium dendrite formation which would puncture the separator, leading to short circuits and explosions; and (2) the operationally low cycling efficiency of the lithium electrode. Even if the lithium electrode cycling efficiency is 99%, the lithium electrode then loses 1% of its capacity each cycle. Thus, after 100 deep chargedischarge cycles, most of the lithium metal has reacted irreversibly with the electrolyte. The cell can no longer be cycled very deeply and has no value as a source of power for a consumer. Thus, it has always been standard practice for lithium metal electrode cells to be built with at least 100% and usually a 400% or more excess of lithium metal. A need exists for a rechargeable battery with the high specific energy and other desirable characteristics of alkali metal, alkaline earth metal or lithium-ion negative electrodes but without the disadvantages.

BRIEF SUMMARY OF THE INVENTION

The present invention of a rechargeable cell with an alkali or alkaline earth metal, or metal-ion, negative electrode includes the physical design and materials used to construct the cell as well as the novel procedures devised to charge and discharge the cell during recycling. Such a rechargeable cell includes an alkali metal or alkaline earth metal electrode with a coulombic capacity about the same as the positive electrode of the cell, which may be a metal halide such as $CuCl_2$, $CuBr_2$ and the like, carbon or a metal oxide such as $LiCoO_2$, $MnO_2$ and the like, and a sulfur dioxide electrolyte solvent. The sulfur dioxide electrolyte contains a salt such as $LiAlCl_4$ or $LiGaCl_4$ that produces a halogen and/or a Lewis acid at the positive electrode on overcharge or at the negative electrode during overdischarge into reversal. On the majority of discharges the cell is discharged to a sufficiently low potential as close to 0.0V as practical without reversal for a sufficient time so that most of the alkali or alkaline earth metal including dendrites is either anodically dissolved or electrically isolated and scavenged. About every 4 to 50 cycles depending on the cycling conditions, the cell design and materials, the cell is overdischarged into reversal for a sufficient coulombic capacity to rebalance the state of charge of the positive and negative electrodes. Such rebalancing is necessary because the Li electrode becomes under charged during recycling. Overdischarge into reversal also generates halogen and/or a Lewis acid that reacts with and scavenges electrically isolated dendrites.

BRIEF DESCRIPTION OF THE DRAWINGS

Other features and advantages of the invention will be apparent from the following description of the preferred embodiments thereof and from the claims, taken in conjunction with the accompanying drawings, in which:

DETAILED DESCRIPTION OF THE INVENTION

Lithium-copper chloride cells according to the invention, having a $LiAlCl_4/SO_2$ electrolyte and with less than 20% excess lithium metal on the negative electrode, can be discharged for over 500 deep cycles at a depth of over 0.80 electrons/$CuCl_2$ without capacity fading or signs of Li dendrite short circuits. To achieve such performance a new method of operating cells was invented which includes discharge to as close to 0.0 V as practical without reversal, i.e., to at least 90–95% discharged and preferably to greater than 99% discharged, and overdischarge into reversal about every 4 to 50 cycles to a depth of about 0.10 $e^-/CuCl_2$ during reversal. The frequency of the overdischarges into reversal depends on the cell design, the electrode materials selected for the cell, the electrolyte composition, the discharge conditions, the past performance of the cell and other factors.

For purposes of clarity some of the terms used herein and in the appended claims to describe the present invention are defined herein below:

The term "current collector" is intended to refer to a chemically inert grid, foil, screen or sheet of high electrical conductivity that is part of an electrode and is used to conduct current from or to the active material and/or conductive additive powder mixed with the active material during discharge or charge to a lead wire or a ribbon of electrically conductive material connected to either a terminal, bus or metal cell case. A ribbon of a conducting material, usually a metal, connecting the current collector to the bus or terminal is often referred to as a tab.

The term "utilization" is intended to refer to the actual number or fraction of equivalents of electrical charge per mole of electroactive material for an electrode delivered during the discharge of a cell with the units of electrons per mole of electroactive material.

The term "positive electrode" is intended to refer to the electrode undergoing oxidation on charge and reduction on discharge. The positive electrode acts as the cathode on discharge and the anode on charge.

The percentage amount of "excess alkali or alkaline earth metal" in the negative electrode of a cell is the ratio of the total negative electrode capacity divided by the nominal positive electrode capacity minus 1.00 multiplied by 100%.

The term "lithium-ion cell" is intended to refer to an electrochemical cell that uses a lithiated carbon intercalation material or other types of lithiated intercalation materials such as $Li_xFe_2O_3$ or $Li_xWO_2$ for the negative electrode instead of metallic lithium.

The term "overcharge" is intended to refer to the forcing of current through a cell after all the active material has been converted to the charged state. For the present invention, overcharge refers to the positive electrode unless otherwise specified.

The term "overdischarge" is intended to refer to discharge past the point where the full capacity of the cell has been obtained.

The term "reversal" is intended to refer to the process in which discharge current is forced through a cell after its capacity has been exhausted thereby changing the normal polarity of the cell. During reversal the direction of the flow of electrons does not change from the direction during discharge.

The term "state-of-charge" is intended to refer to the available capacity in a cell or a particular electrode in a cell as a percentage of rated capacity.

The phrase "reduce the state-of-charge of the positive electrode with respect to the negative electrode" is intended to refer to methods of the present invention such as overdischarge with a substantial amount of reversal that decreases the state-of-charge of the positive electrode so that the state-of-charge of the positive and negative electrodes become of a more similar amount. In many cases it may not be practical or yield optimal performance to reduce the state-of-charge of the positive electrode relative to the negative electrodes so that they are approximately equal after only one or two full cycles.

The term "cosolvent" is intended to refer to a non-aqueous solvent present in an $SO_2$ electrolyte solution in a smaller proportion by weight than the $SO_2$. The purpose of the cosolvent may be to improve the lithium cycling efficiency or the lithium plating morphology or to alter physical properties such as the vapor pressure or freezing point or the solubility of salts.

In Li metal electrode cells of the present invention with $SO_2$ electrolyte solvents, the Li electrodes contain preferably only about 5 to 20% excess (or 105%–120%), and at the most 50% excess (or 150%), Li metal when constructed relative to the coulombic capacity of the positive electrode. At the end of the first or second discharges and the majority of subsequent discharges, the cells are discharged to about 0.0 V with respect to the positive electrode. Thus, almost all the Li metal is anodically dissolved from the Li electrode current collector during the discharge to about 0.0 V and any remaining Li dendrites would be electrically isolated so that they could no longer grow further during subsequent charge cycles. The electrically isolated Li dendrites are then scavenged by the $Cl_2$ and $AlCl_3$ produced during overcharge and especially during overdischarge into reversal. During overdischarge into reversal, the deleterious Li dendrites are the only Li metal present in the cell, and there are no competing reactions for the $Cl_2$ and Lewis acid with the freshly plated Li metal required for discharge as occurs during overcharge. Also, the $Cl_2$ and $AlCl_3$ concentrations become much higher during overdischarge into reversal in cells of the present invention using a $LiAlCl_4/SO_2$ electrolyte. The higher $Cl_2$ and Lewis acid concentrations may result in more rapid Li dendrite scavenging. However, the higher $Cl_2$ and Lewis acid concentrations during overdischarge into reversal require that special corrosion resistant cell cases of Ni, Ni alloys or other materials be used for cells of the present invention rather than the austenitic stainless steel cases, such as type 304L that are generally adequate for cells with a large excess of Li metal and $SO_2$ electrolytes.

Some of the advantages of the present invention over the prior technology for Li metal electrode cells with a large excess of Li metal and $SO_2$ electrolyte solvents are as follows. First, the cycle life has been increased from about 200 cycles to over 600 consecutive cycles with an average discharge utilization greater than 0.80 electrons/$CuCl_2$. Second, during cycling for over 600 cycles, negative potential transients indicative of high resistance Li dendrite short circuits are rarely observed. Third, recycle life is limited by capacity fading due to capacity losses by the Li electrode rather than by Li dendrite short circuits or venting as occurs with the prior designs with a large excess of Li metal. Fourth, unoptimized cells of the present invention can be charged for at least 40 consecutive cycles at 5.0 mA/cm$^2$ without Li dendrite short circuits or substantial capacity fading. Prior art cells could be charged for at least 40 consecutive cycles only at 1.0 mA/cm$^2$. At 5.0 mA/cm$^2$ Li dendrite short circuits appear in prior art cells after 1–2 cycles. Fifth, at the end of the first discharge to a 0.10 V to an about 0.0 V cut-off, cells in accordance with the present invention contain either no lithium metal or an insignificantly small amount on the negative electrode, making the cells safe to ship and allowing the cells to better withstand either severe mechanical or thermal abuse.

The present invention of a rechargeable cell with an alkali or alkaline earth metal electrode includes the physical design and materials used to construct the cell as well as the novel methods devised to charge and discharge the cell during recycling. The amount of lithium metal on the lithium negative electrode, the current collector material and surface characteristics and the electrical insulation of parts of the negative electrode are important aspects of the physical design of cells of the present invention. A suitable Li electrode consists of a layer of Li foil pressure bonded to a Ni foil current collector. The thickness of the Li foil is selected so that the coulombic capacity of the Li metal on one side of the Li electrode is about 1 to 15% greater than the capacity of the positive electrode that will be discharged by the particular Li electrode. Should the positive electrode contain a metal foil or expanded metal grid as the current collector between two sheets of electroactive material, then the coulombic capacity that would be discharged by one side of a Li electrode opposite the positive electrode would be half the total capacity that the positive electrode would be discharged to in order to give optimum performance in terms of recycle life or some other performance parameter. Thin metal foils of metals, such as Ni or Mo, are preferred instead of expanded metal as the current collector for the Li electrode because the thin metal foils not only provide a more uniform planar surface for Li deposition but also because the metal foil increases the energy density of cells since they are thinner than expanded metal grids and use space more efficiently. Since it is often not practical to obtain Li foil of the precise thickness to meet the capacity requirements for the Li electrode, the Li foil on the Li electrode may be somewhat thicker than the precise thickness required but may be cut smaller than the perimeter dimensions of the positive electrode. The Li foil should be trimmed until it has a weight such that the calculated Li capacity falls within the range of acceptable capacities for the Li electrode. If cells are constructed with Li electrodes with less Li than the positive electrode capacity, they will not achieve the required capacity on early cycles and may not achieve a capacity as large as the capacity of the positive electrode during later cycles. A cell with a negative electrode with alkali metal electrodes with greater than about 15% more capacity than the positive electrode may deliver the capacity of the positive electrode at potential over 1.5 V and the cell may have to be recycled several cycles before it can be discharged to a 0.5 to 0.0 V cut-off before reaching the nominal capacity of the positive electrode. If cells with Li electrodes with greater than about 15% more capacity than a $CuCl_2$ positive electrode are discharge to 1.5 to 0.0 V and deliver utilizations substantially greater than 1.0 $e^-/CuCl_2$, the positive electrode may be irreversibly damaged and the cycle life, rate capability or other performance features of the cell limited. Discharge of Li electrode cells with metal halide positive electrodes and $SO_2$ electrolytes below about 2.5 V vs. $Li/Li^+$ can lead to the reduction of $SO_2$ on the carbon conductive additive in the positive electrode to form $Li_2S_2O_4$ (lithium dithionite) and other reduction products which will limit cycle life and performance. For such and other reasons, large high rate cells of the present invention, that is with capacities over about 1.0 Ahr for operation over about 2.0 $mA/cm^2$ with several positive electrodes electrically connected in parallel and several Li negative electrodes connected in parallel, may require that there should not be large variations, preferably less than 5%, in the capacities of the positive electrodes and in the capacity/unit area over the surface of the positive electrode.

Other metal foils or grids such as Ta or other metals or alloys that resist corrosion by the halogen and Lewis acid and electrolyte salt in the $SO_2$ electrolyte over the operating potential range of the cell could be used, but Ni or Mo foil are preferred. To improve the cycling efficiency of the Li electrode, the metal foils can be coated with a thin layer of carbon or other corrosion resistant conductive material. Prior to the application of the Li foil to the metal foil current collector, it is preferred that the surface area of the metal foil be increased by abrasion with approximately 400 grit aluminum oxide cloth, or an equivalent method of abrasion, then cleaned with soap and water, deionized water, acetone and oven dried below 100° C. Other methods of surface treatment such as coating with a carbon layer have been evaluated and they do not appear to have a significant effect on the lithium electrode cycling efficiency.

Depending on the geometric design of a cell, for example whether it is a spiral wound cyclindrical cell or a prismatic cell, and the cycling conditions for a particular application, it may be necessary to insulate parts of the negative electrode current collector. For example, it is believed that insulating the back side of the negative electrode current collectors of the negative electrodes at the end of the electrode stack of a prismatic cell with n+1 negative electrodes and n positive electrodes will produce a more uniform current density distribution and prevent interior positive electrodes of the stack from being discharged at excessively high current densities during high rate discharge, which would reduce the utilization of positive electrode material.

The metal halide or metal oxide positive electrode material is compressed together with about 30 to 5% by weight graphite as a conductive additive and about 10 wt % of a binder such as polytetrafluoroethylene (TFE). The preferred amount of the metal halide or oxide positive electrode active material is between 60 and 85 weight percent.

Either non-woven glass fiber separators or microporous ethylene-tetrafluoroethylene (ETFE) separators or a combination of the two are suitable for the separator system of cells in accordance with the present invention.

Commercial cells in metal cases that utilize the present invention will require special corrosion resistant cases of Ni, Ni alloys such as Monel 400 or stainless steel or other metals with a protective surface coating of Ni, Ta, Mo or other corrosion resistant material. It has been found that austenitic stainless steel cases, such as type 304L and 301 corrode and the dissolved Fe causes capacity fading in $Li/CuCl_2$ cells with $LiAlCl_4/SO_2$ electrolyte in less than 100 deep cycles. The inside of the metal cells cases could also be protected from corrosion by the halogen and Lewis acid produced by electrolyte oxidation by a coating of a plastic material that is chemically and mechanically stable when exposed to the electrolyte during extended cycling such as TFE or ETFE as taught in U.S. Pat. No. 4,863,815. However, a corrosion resistant metal coating is required for the area where the cover is welded onto the case unless a plastic or rubber gasket and a crimp type seal is employed to seal the cover. The electrolyte fill tube and other cell hardware exposed to electrolyte also must be fabricated from a corrosion resistant material such as Ni or a Ni alloy.

It has been found that the presence of trace amounts of impurities, such as $LiAlCl_3OH$ in the $LiAlCl_4/SO_2$ electrolyte caused by water contamination, will lower the Li electrode coulombic recycling efficiency by as much as 20%. The presence of $LiAlCl_3OH$ in $SO_2$ electrolytes may be determined by monitoring the absorption band at 3350 $cm^{-1}$ in the infrared spectra using a long pathlength infrared sample cell. In principle, the lower the lithium electrode recycling efficiency, the more frequently a cell of the present invention will have to be overdischarged into reversal.

New methods have been invented for charge and discharge during recycling for cells of the present invention. These new methods were required to facilitate the efficient scavenging of Li dendrites and to decrease the state of charge of the positive electrode with respect to the negative electrode, as well as to accomplish other functions which ensure that the rechargeable cell gives optimum performance. On the majority of all the discharges, lithium metal electrode cells, for example, should be discharged to a potential from about 1.5 V to 0.00 V with respect to the positive electrode. Discharges to as close to 0.00 V as possible without reversal ensure the most complete anodic dissolution of Li metal as possible and thus are preferred (see Example 1). Resistive discharges below about 0.5 V for up to several hours are preferred to constant current discharges (see Example 1) because during constant current discharges the rate of decrease of the cell potential below about 0.2 V becomes very rapid, and without special equipment the cell will be over-discharged into reversal. An excessive frequency of constant current discharge with constant current discharge into reversal at rates above about 0.4 $mA/cm^2$ for 100 to 25% of the number of cycles is not preferred for $Li/CuCl_2$ cells with $LiAlCl_4/SO_2$ electrolyte, and also for other positive electrode $SO_2$ electrolyte combinations, because it does not permit the maximum anodic dissolution of Li dendrites and Li foil on or near the negative electrode current collector. Constant current discharge into reversal, especially at rates above about 0.40 $mA/cm^2$, may cause a higher proportion of the Li dendrites to preferentially anodically dissolve near the point of their attachment to the negative electrode current collector and become electrically isolated. Positive potential transients are frequently observed during low rate resistive discharges at potential below 0.10 V which are thought to be caused by electrically isolated Li dendrites that move and reestablish electrical contact with the negative electrode current collector and are anodically dissolved. Thus, long term resistive discharges at about 0.10 V to almost 0.00 V for several hours or as long as practical are preferred. For such resistive discharges below about 0.05 V, it is believed that load resistors with resistances greater than about 50 ohms should be used because otherwise the last Li dendrites remaining on the negative electrode will be discharged at an excessively high local current density and the combination of polarization heating and rapid Li metal reactions with the $SO_2$ electrolyte will cause local high temperatures that could damage the cell or cause it to vent.

About every 4 to 50 cycles, depending on the performance of a cell, the depth of discharge (see Examples 2 and 3) and other cycling conditions, variations of the mAhr/cm$^2$ capacity distribution on the positive electrode surface and other features of cell construction and design, cells of the present invention should be resistively discharged to about 0.00 V as previously described and then overdischarged into reversal for a time in reversal that gives optimal performance for a particular metal halide, carbon or metal oxide positive electrode and $SO_2$ electrolyte combination. The capacity passed during reversal should be less than the theoretical capacity of the positive electrode. The passage of a capacity during reversal of from about 5 to 15% of the theoretical capacity of the positive electrode at a rate lower than about 1.0 mA/cm$^2$ is preferred. In Example 1, for Li/CuCl$_2$ cells with LiAlCl$_4$/SO$_2$ electrolyte reversal for a time and depth equivalent to 0.10 electrons/CuCl$_2$ at 0.40 mA/cm$^2$ constant current has yielded over 600 cycles at an average utilization depth greater than 0.80 electrons/CuCl$_2$. Moderate (e.g., 1.0 mA/cm$^2$) to high rate constant current discharge (e.g., greater than 5.0 mA/cm$^2$) to about 0.50 V followed by lower rate discharge (e.g., 0.4 mA/cm$^2$) into reversal and then overdischarge in reversal is an optional procedure but it is not preferred.

The overdischarge of cells into reversal serves at least two purposes. First, a halogen such as Cl$_2$ and a Lewis acid such as AlCl$_3$, produced at the negative electrode current collector during reversal, react with and scavenge Li dendrites. Since the Li dendrites are the only Li metal in the cells during overdischarge into reversal, it is expected that the halogen and Lewis acid concentrations become much larger than during overcharge, and thus it is likely that the Li dendrite scavenging rate is much greater. The second purpose of overdischarge into reversal is to decrease the state of charge of the positive electrode with respect to the Li negative electrode.

During cycling of cells without excess Li metal constructed according to the present invention, on each full cycle the Li electrode receives less Li metal during charge because the coulombic cycling efficiency of the Li electrode is less than 100%. As a result, on each subsequent cycle the positive electrode is not fully discharged and reaches full charge and overcharge with the production of halogen and Lewis acid before the Li electrode is fully charged. Further charging of the cell after halogen and Lewis acid begin to be produced will not effectively charge the Li electrode because the halogen and Lewis acid will react with a portion of the Li as it is electrodeposited. Typically, after less than 20 cycles, the discharge capacity of the cell begins to fade, and for a constant charge time at constant current for a series of cycles, the charge potential with respect to time curves may indicate an increase in the amount of overcharge. An analysis of the discharge and charging potential curves for the group of cycles between two discharges followed by overdischarges into reversal may be carried out for a cell to estimate how frequently overdischarges into reversal should be undertaken for that particular cell design and discharge and charging conditions. The group of cycles between two discharges followed by an overdischarge into reversal is defined here as a set of cycles.

The amount of discharge capacity fading and overcharge that may be permitted during cycling before overdischarge into reversal is necessary will depend on the metal halide, carbon or metal oxide positive electrode and $SO_2$ electrolyte combination as well as the performance objectives for the cell. For example for the Li/CuCl$_2$ cell with LiAlCl$_4$/SO$_2$ electrolyte, it is preferred that cells should be overcharged only 5 to 7% to maximize cycle life at about 1.0 mA/cm$^2$ discharge at about 23° C. If for the Li/CuCl$_2$ cell during a set of cycles, the discharge utilization decreases by more than 10 to 15% then the coulombs of charge applied should be reduced to provide no more than about 5 to 7% overcharge. Excessive overcharge is believed to be deleterious and to lead to capacity fading because the halogen produced during overcharge does not all react with Li, and a substantial portion is discharged as revealed by an abnormally high average discharge potential on the following discharge. The discharge of the halogen results in the positive electrode being only partially discharged when the Li electrode is fully discharged. Thus, on the next charge the positive electrode reaches overcharge sooner, with the Li electrode receiving even less charge before overcharge and Li scavenging begin.

Determining precisely when overcharge should begin depends on the elemental composition of the particular positive electrode material, the amount and type of conductive additive in the positive electrode and the electrolyte composition and concentration. Generally, the charge potential versus time curve has a long plateau for the charging of the positive electrode which then increases rapidly to a second plateau for the oxidation of the electrolyte salt. The change in slope of the charging curve as a function of time is preferred as a more reliable method for defining the start of overcharge than a particular value of potential or increase in potential because the potential of the first charging plateau can increase approximately 300 mV for some cells during extended cycling. The explanations that have just been presented of the electrochemical theory of operation during cycling, discharge reversal and overcharge are not to be construed as limitations on the present invention.

To cycle cells according to this invention computer controlled chargers and power management systems are preferred for systems requiring medium to long recycle lives because of the numerous decisions regarding when to resistively discharge, adjust the charging time or begin overdischarge into reversal as well as other changes in the cycling regime. Such computer controlled chargers and power management systems would record and analyze the cell potentials and current in real time and may utilize expert system software to determine when the values of parameters of particular steps of the cycling regime should be adjusted.

In a preferred embodiment of the present invention a rechargeable cell includes a lithium negative electrode and a copper chloride (CuCl$_2$) positive electrode. This does not preclude the utilization of other alkali metal, alkaline earth metals or alloys of such metals with Al, Zn, Sn, Bi, Ag and the like as negative electrodes. This also does not preclude the utilization of other metal halide positive electrodes such as CuBr$_2$, NiCl$_2$, CoCl$_2$, CrCl$_3$, AgCl$_2$, MnCl$_2$, MoCl$_3$, MoCl$_5$, Mo(OCl)$_2$, FeBr$_3$, and the like, metal oxide electrodes such as MnO$_2$, LiMn$_2$O$_4$, LiCoO$_2$, LiNi$_x$Co$_y$O$_2$, LiNiO$_2$, LiFeO$_2$, V$_2$O$_5$ and the like or a carbonaceous material such as described in U.S. Pat. No. 4,513,067 issued to Kuo et al. Cells with metal oxide electrodes such as LiCoO$_2$, LiNiO$_2$, or the like that would be irreversibly damaged by discharge below about 2.5V with respect to Li/Li$^+$ or discharge in reversal should utilize positive electrodes containing a substantial amount of a carbonaceous material, generally from 2 to 30 wt %, on which SO$_2$ could be reduced to protect the metal oxide electrode from being reduced during a reversal of a substantial capacity. Often it is preferred to reduce the amount or totally eliminate the carbonaceous conductive additive from metal oxide positive electrodes such as LiCoO$_2$ in Li cells with LiAlCl$_4$/SO$_2$ or LiGaCl$_4$/SO$_2$ electrolytes that require charging above about 3.8 V in order increase the potential for electrolyte oxidation on charge, but the elimination or reduction of the carbonaceous additive should not occur for cells of the present invention with metal oxide electrodes. Positive electrodes of the present invention must contain at least 5 wt % of a carbonaceous material, preferably graphite, so that when the metal halide or metal oxide electrode active material is fully discharged above about 2.8 V, then SO$_2$ will be reduced at a potential below about 2.8 V vs. Li/Li$^+$ on the carbon rather than the positive electrode active material being irreversibly reduced. Carbonaceous materials such as graphite are catalytic surfaces with a high surface area for the reduction of SO$_2$. Irreversible overdischarge of metal oxide and metal oxide positive electrode active materials could occur during overdischarge into reversal when cells are cycled according to the method of the present invention to scavenge Li dendrites and to decrease the state of charge of the positive electrode with respect to the negative electrode. Since the precise state of charge of the positive electrode is not know in practical cells without reference electrodes, there is a risk of overdischarging the positive electrode during overdischarge in reversal of cells of the present invention unless the electrode contains at least 5% of a carbonaceous additive.

For the present invention LiAlCl$_4$/SO$_2$ is the preferred electrolyte, with LiGaCl$_4$/SO$_2$ as the second choice. For cells with CuCl$_2$ and other positive electrodes this does not preclude the use of Li$_2$B$_{10}$Cl$_{10}$, Li$_2$B$_{12}$Cl$_{12}$, LiAlBr$_4$, LiGaBr$_4$, LiTaCl$_6$, LiNbCl$_6$, LiSbCl$_4$, and Li$_3$SbCl$_6$ and other tetrahalogen salts of Group IIIA elements as well as other lithium salts that are soluble in SO$_2$ and oxidize above 3.3 V versus the negative electrode to generate halogen and/or a Lewis acid or other compounds capable of scavenging alkali metal or alkaline earth metal dendrites. It is preferred that cells with other alkali or alkaline earth negative electrodes would utilize electrolyte salts with a cation of the same element as the negative electrode active metal. However, other cations may be added to the electrolyte to improve the morphology of electroplating at the negative electrode or for other purposes.

An additional embodiment of the present invention is a method of discharging, charging and cycling cells with lithium-ion type negative electrodes and SO$_2$ electrolytes containing electrolyte salts that produce a halogen such as Cl$_2$ and/or a Lewis acid or other compounds capable of scavenging Li metal dendrites. A lithium-ion cell is only capable of intercalating a predetermined amount of Li$^+$ ions during charge approximately equal to the rated capacity of the electrode. If a Li-ion cell is charged beyond the capacity of the negative electrode to intercalate Li$^+$, then Li metal and most likely Li metal dendrites will be deposited on the negative electrode, which may puncture the separator and cause an inter-electrode short circuit. Such a short circuit will discharge the cell and may limit the cycle life or cause exothermic reactions that may damage the cell or cause the cell to vent. Such plating of Li metal may occur near the end of charge or during accidental overcharge in the Li-ion cell with the lowest capacity in a battery in which the cells are electrically connected in series or in single cells at very high charging rates.

The performance of Li-ion/LiCoO$_2$ cells with a LiAlCl$_4$/SO$_2$ electrolyte is described by Hossain in "Handbook of Batteries" 2nd Edition by Linden pp 36.54 to 36.58 (1995). The performance of Li-ion/carbon cells with an SO$_2$ electrolyte was described in U.S. Pat. No. 5,601,951 issued in 1997 to Johnson et al. In both cases the Li-ion cells were not discharged below about 0.5 V, thus the cells were not overdischarged, either to below 0.01 V or further into reversal to scavenge Li metal or Li dendrites and to decrease the state of charge of the positive electrode as taught by the present invention.

A preferred embodiment of a Li-ion cell with an SO$_2$ electrolyte in accordance with the present invention includes a Li-ion negative electrode of a suitable graphite, a porous separator, a CuCl$_2$ positive electrode and a LiAlCl$_4$/SO$_2$ or LiGaCl$_4$/SO$_2$ electrolyte. During cycling such cells would either be discharged to about 0.00 V for all discharges, preferably by a resistive discharge below 1.00 V or only for selected discharges depending on the cell design, past performance of the cell being cycled, the cycling conditions or other factors such as the available time for a particular cycle for an application. Many of the selection criteria just listed would also be used to determine on which discharges a lithium-ion cell would be overdischarged into reversal and the capacity of the reversal period. The occurrence of positive potential transients during discharge below about 1.00 V or during overdischarge into reversal would indicate the reduction of Li dendrites and could be utilized to determine the frequency that deep discharges to about 0.00 V with or without a following period of reversal should be carried out.

Figure 1:
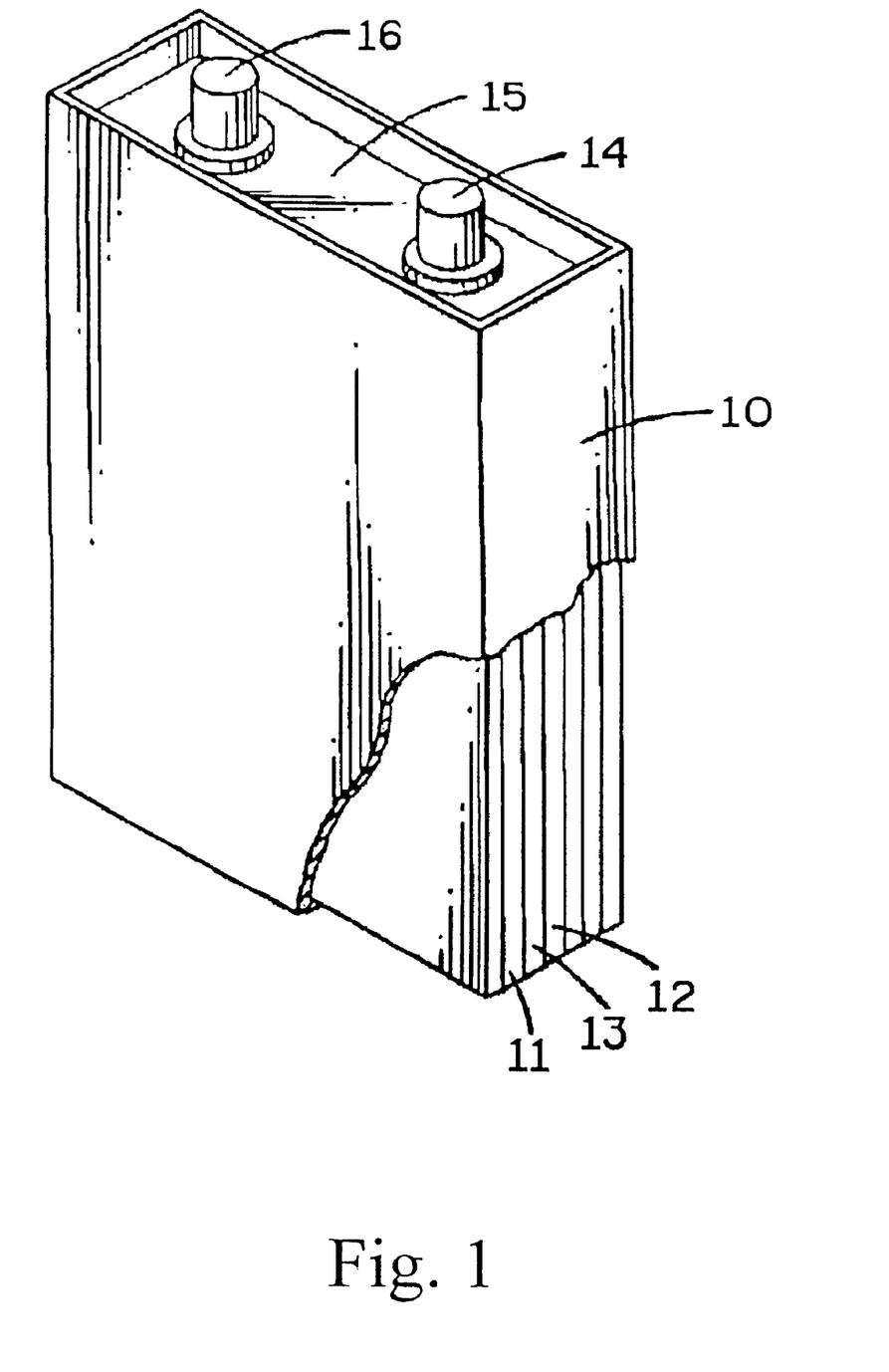
FIG. 1 shows a rechargeable electrochemical cell in accordance with the present invention.

A rechargeable electrochemical cell in accordance with the present invention is illustrated in FIG. 1. The cell includes a sealed container 10 containing a stack of alkali metal, alkaline earth metal or lithium ion electrodes containing negative electrode members 11 in alternation with positive electrode members 12. Adjacent positive and negative electrode members are separated from each other by porous separator sheets 13 of an insulating material which is inert to the components of the cell. The negative electrode members are connected together by internal connections (not shown) to a terminal 14 which extends through and is insulated from a cover 15 sealed to the container 10. In a similar manner, the positive electrode members 12 are internally connected to a terminal 16. The cell also contains an electrolytic solution comprising a solvent of SO$_2$ and an electrolyte solute, preferably LiAlCl$_4$.

In order to more clearly illustrate the efficacy of the present invention, the following examples are presented. It is understood that such examples are for illustrative purposes only and that specifics contained therein are not to be construed as limitations on the present invention.

EXAMPLE 1

Figure 2:
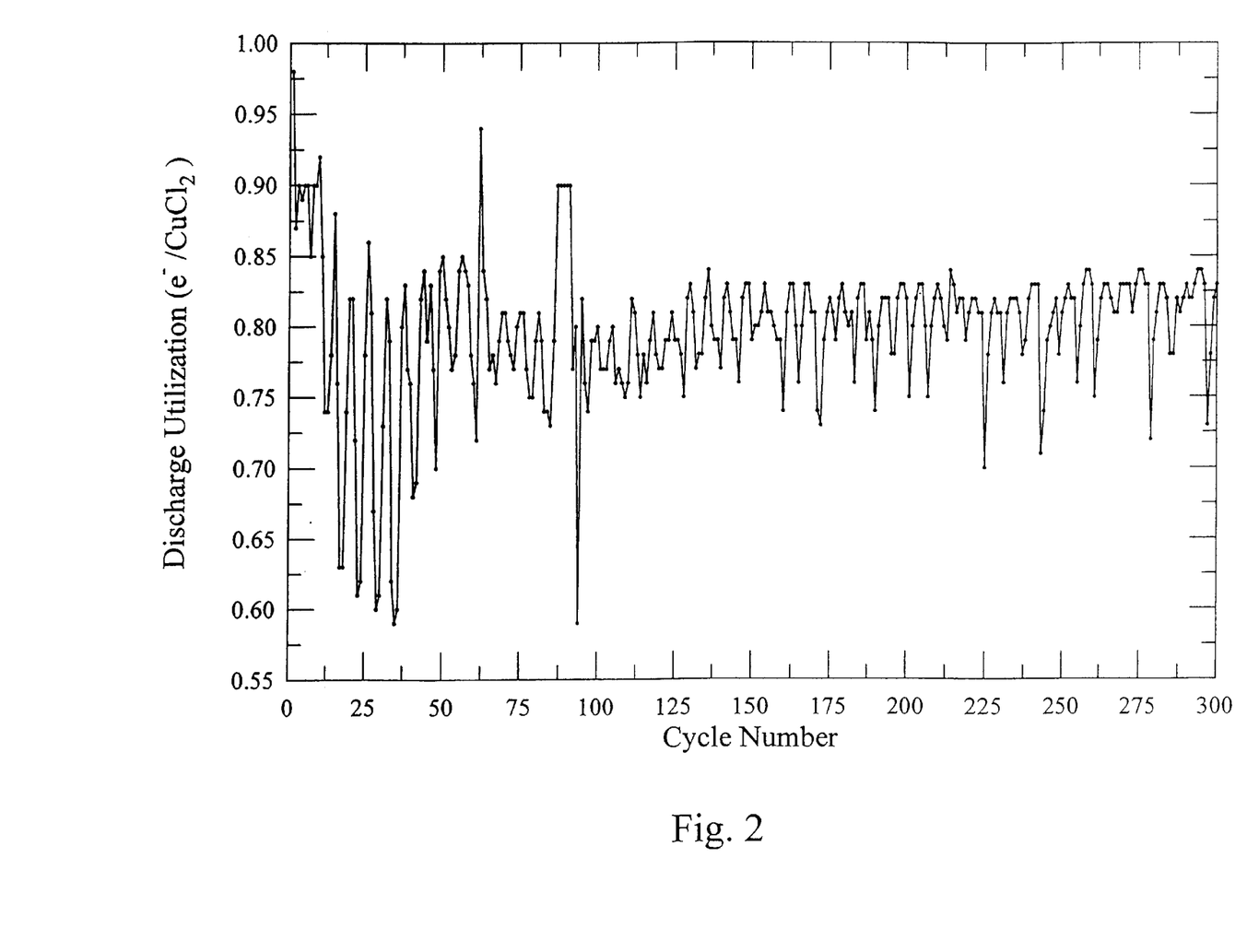
FIGS. 2 and 3 are graphs showing the discharge utilization of a $Li/CuCl_2$ cell plotted versus the cycle number.
Figure 3:
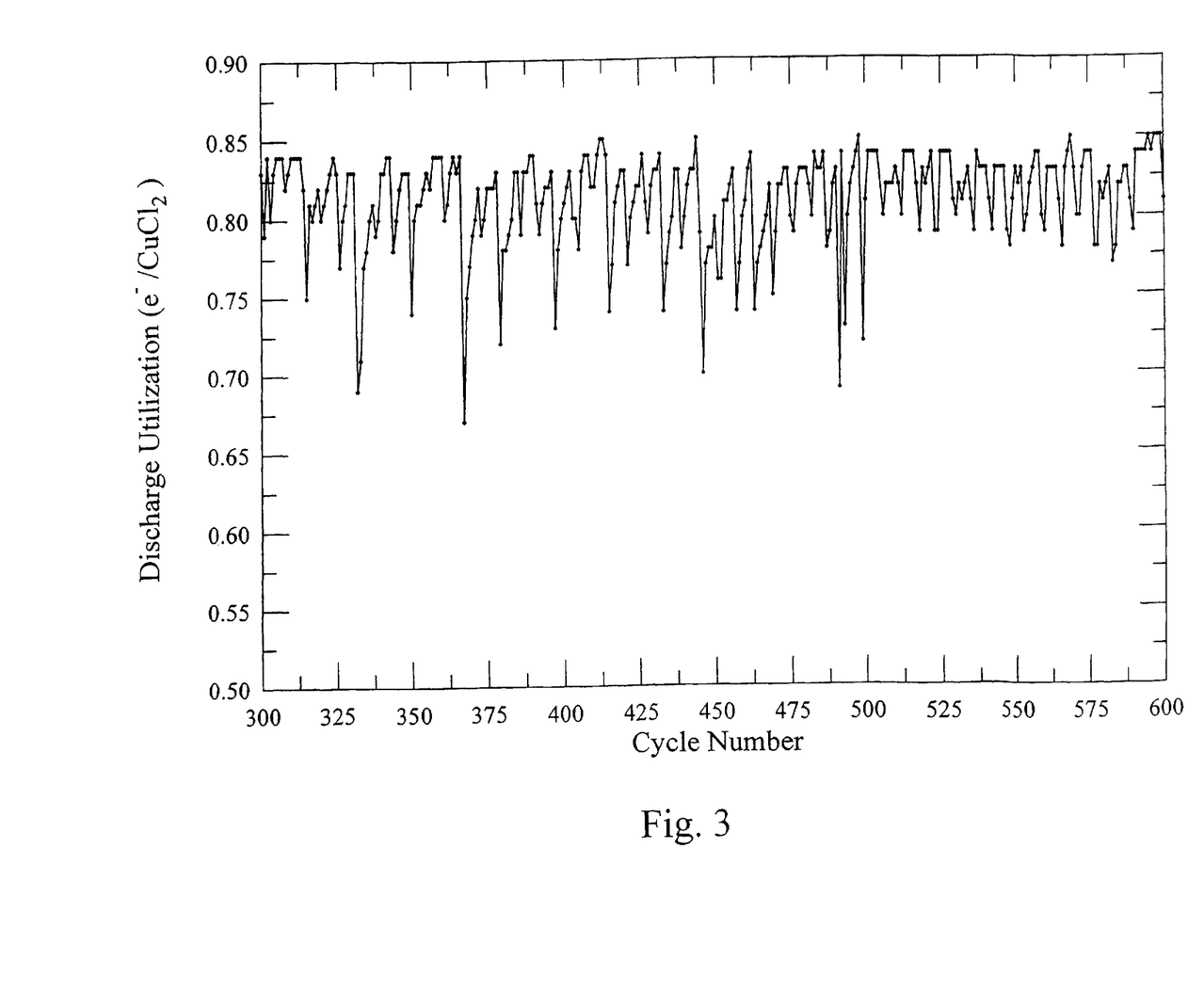
Figure 4:
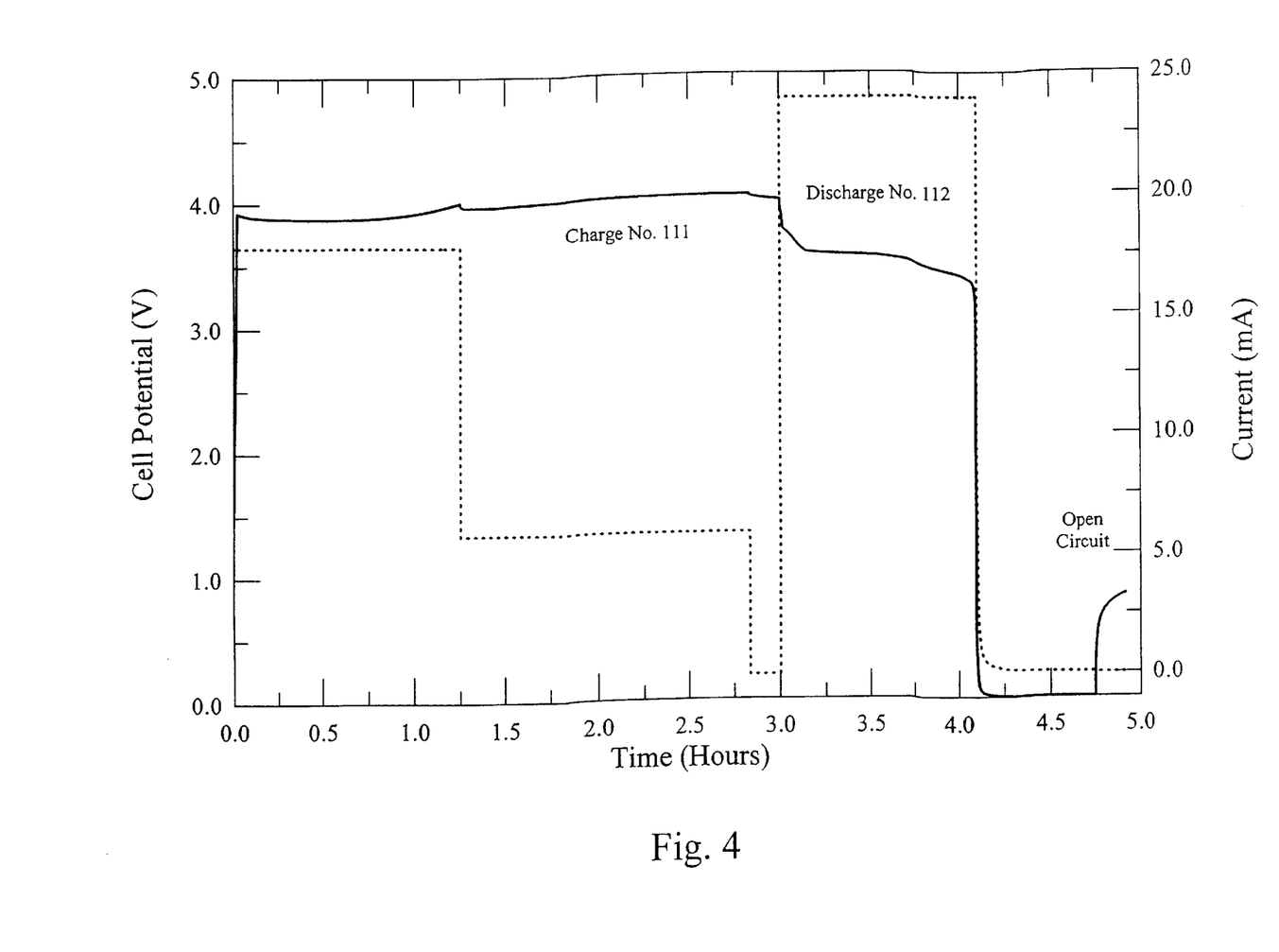
FIG. 4 is a graph showing the cell potential and current of a $Li/CuCl_2$ cell during constant current charge and discharge.

A cell was made having two Li electrodes 2.0×3.0 cm of 0.076 mm thick Ni foil with 0.051 mm thick Li foil pressed on one side so that the combined capacity of the two Li electrodes was 38.6 mAhr. The back sides of the Ni foil current collectors of the Li electrodes were insulated with a heat bonded layer of ETFE film prior to the Li foil being applied. The cell contained a single CuCl$_2$ electrode 2.0×3.0 cm, 0.292 mm thick that consisted of a 0.076 mm thick Ni foil coated using a non-aqueous pasting process on both sides with a sintered and pressed mixture of 60 wt % CuCl$_2$, 30 wt % graphite and 10 wt % TFE. The Ni foil current collector of the CuCl$_2$ electrode was coated with an approximately 0.03 mm thick layer of 70 wt % TFE and 30 wt % carbon black and sintered prior to two layers of the $CuCl_2$, graphite, TFE mixture being pasted, pressed and sintered onto each side the Ni current collector. The theoretical capacity of the $CuCl_2$ electrode was 32.3 mAhr based on 1.0 $e^-/CuCl_2$. Thus the cell contained 19.5% excess Li metal capacity. The $CuCl_2$ electrode was wrapped with three layers of Whatman (grade F487-05) nonwoven glass fiber separator with two pieces 4.6×4.4 cm folded around either side of the electrode and a single 9.2×2.2 cm piece of glass fiber separator folded in a "U" fold around the bottom of the electrode. The Li electrodes were wrapped with separators in the same way. The cell element was assembled with the $CuCl_2$ electrode wrapped with separator sandwiched between the two Li electrodes wrapped in separator. The cell element was enclosed in a 2.54 cm id thick walled Pyrex glass tube fitted with a thick walled Pyrex cap with three glass-to-metal sealed leads. The cell cap was held onto the tube with a metal coupler with rubber "O" rings. The cell element was held tightly in place inside the 2.54 cm id glass tube with two Monel 400 truncated half cylinders and three flat TFE shims machined to fit the rounded bottom of the tube to restrict the volume of excess electrolyte. The cell was vacuum filled with 13 g of 32.5 wt % $LiAlCl_4/SO_2$ electrolyte. FIG. 2 depicts the discharge utilization of the cell from Discharges 1 to 300. FIG. 3 depicts the discharge utilizations of the cell from Discharges 301 to 600. The cell was discharged at 2.0 mA/cm to a 0.50 V cut-off, then resistively discharged for 1.0 hr through a 49 ohm resistor. The cell was charged at 1.5 mA/cm² for 1.25 hr and 0.5 mA/cm² for 1.59 hr for a total charge applied equivalent to 0.99 $e^-/CuCl_2$. FIG. 4 depicts the cell potential as a dark line and the total cell current as a dotted line during Charge 111 and Discharge 112 which included a 2.0 mA/cm² constant current discharge followed by a 49 ohm resistive discharge. The total capacity of Discharge 112 including the resistive discharge was equivalent to 0.81 $e^-/CuCl_2$. The cell was overdischarged with reversal of the cell potential at 0.40 mA/cm² with a capacity corresponding to 0.10 $e^-/CuCl_2$ during reversal. Discharge followed by 0.10 $e^-/CuCl_2$ of reversal was carried out after Discharges 7, 12, 19, 21, 25, 31 and about every five discharges thereafter. The average discharge utilization during 675 consecutive cycles for the cell was greater than 0.82 $e^-/CuCl_2$. The high cycle life of the cell also demonstrates that microporous separators are not necessary in some cases to achieve high recycle life.

EXAMPLE 2

Figure 5:
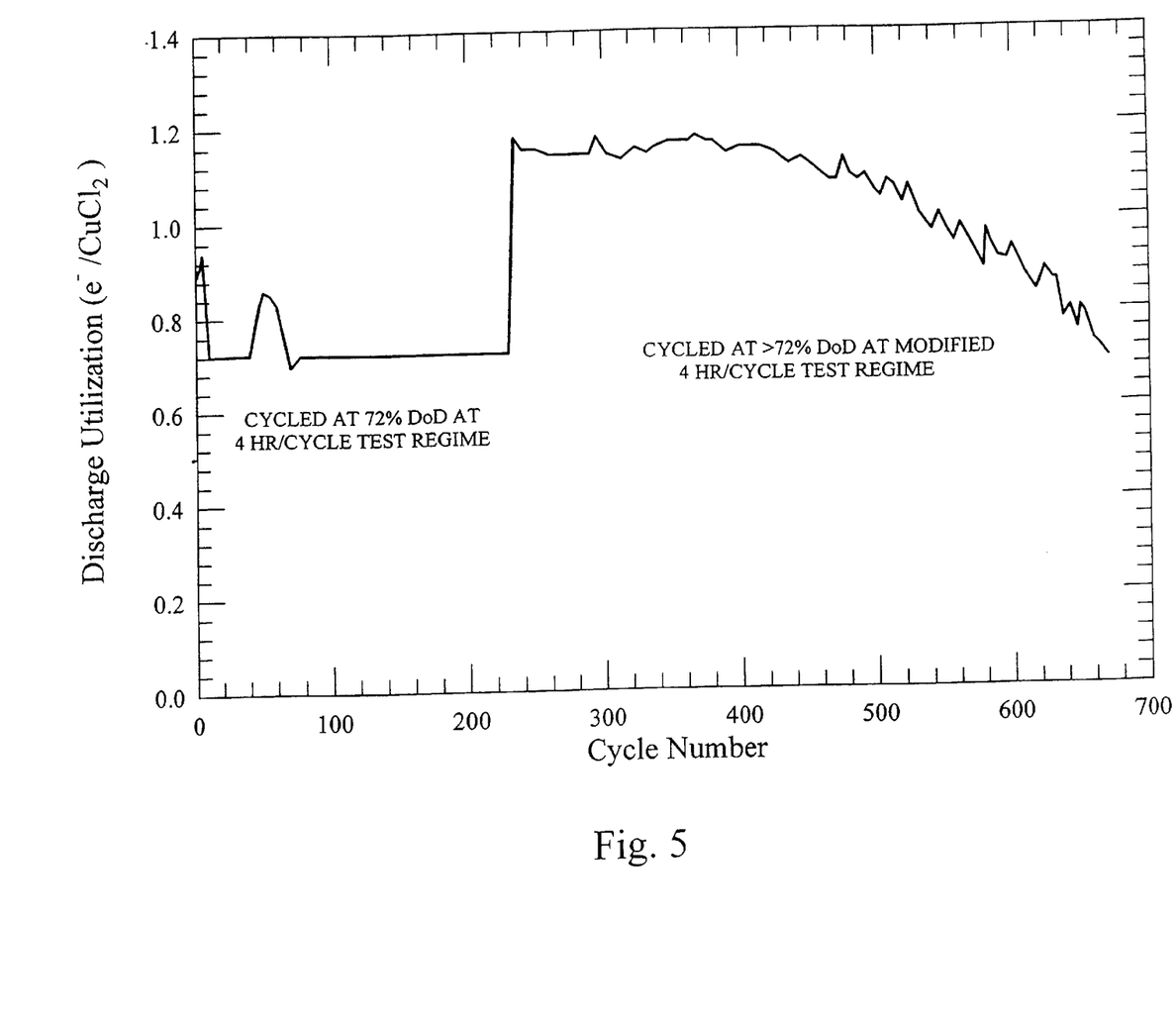
FIG. 5 is a graph showing the discharge utilization of a $Li/CuCl_2$ cell plotted versus the cycle number.

The $Li/CuCl_2$ cell of Example 2 was constructed in a similar manner as the cell of Example 1 except for the following modifications. The two Li electrodes each measured 2.2×3.3 cm with a combined Li metal weight of 0.008 g for a capacity of 31 mAhr. The $CuCl_2$ electrode contained 0.141 g of $CuCl_2$ with a theoretical capacity of 28.1 mAhr based on 1.0 $e^-/CuCl_2$. Thus, the cell contained 10.3% excess Li metal capacity. The $CuCl_2$ electrode was 0.283 mm thick including the 0.076 mm thick Ni foil current collector. The Li electrodes were first wrapped with a 9.2×2.2 cm sheet of glass fiber separator and then wrapped with two 6.1×10.8 cm sheets of ETFE microporous separator with the weak directions 90 degrees to each other. The microporous separator was first folded with two side folds and then a "U" fold around the bottom of the electrode. The cell package was tightly held in place with two truncated half cylinders of TFE with rounded bottoms. The cell was vacuum filled with 24 g of 28.7 wt % $LiAlCl_4/SO_2$. FIG. 5 depicts the discharge utilization of the cell at 27.8±2° C.

from Discharges 1 to 670. For Cycles 1 to 6 and 40 to 63 the cell was charged at 0.50 MA/cm² and discharged at 1.0 mA/cm². For Cycles 7 to 39 and 64 to 672 the cell was charged at 0.79 mA/cm² and discharged at 1.69 mA/cm². The discharge cut-off potential was 0.50 V from Discharge Nos. 1 to 4 and 1.50 V from Discharges 15 to 63 and on Discharges 70, 159 and 437 to 670. Resistive discharges were not performed but the cell was overdischarged into reversal at 0.4 mA/cm² with a capacity equivalent to 0.10 $e^-/CuCl_2$ during the reversal of the cell potential after Discharges 29, 46, 229, 256, 272, 291, 309, 330, 349, 369, 382, 402, 417, 438, 453, 474, 489, 505, 521, 542, 558, 580, 597, 620, and 639. The discharge was intentionally limited to 0.72 $e^-/CuCl_2$ (72% depth of discharge) on Discharges 74 to 229 with cut-off potentials above 3.0 V for most of the discharges. During the period of 72% DoD discharges before Discharge 234, the cell did not require overdischarges into reversal. From Discharge 234 to 638 the discharge cut-off potential was 1.50 V and the average discharge potentials were all above 3.38 V.

EXAMPLE 3

The $Li/CuCl_2$ cell of Example 3 was constructed in a similar manner as the cell of Example 2 except for the following modifications. The two Li electrodes each measured 2.2×3.3 cm with a combined Li metal weight of 0.008 g for a capacity of 31 mAhr. The $CuCl_2$ electrode contained 0.1317 g of $CuCl_2$ and was 0.27±0.008 mm thick including the 0.076 mm thick Ni foil current collector with a capacity of 26.2 mAhr. Thus, the cell contained 18% excess Li metal capacity. The Li electrodes were wrapped with separator as described for Example 2 only one layer of ETFE microporous separator was used instead of two layers. The cell was vacuum filled with 14 g of 30.3 wt % $LiAlCl_4/SO_2$ electrolyte.

Figure 6:
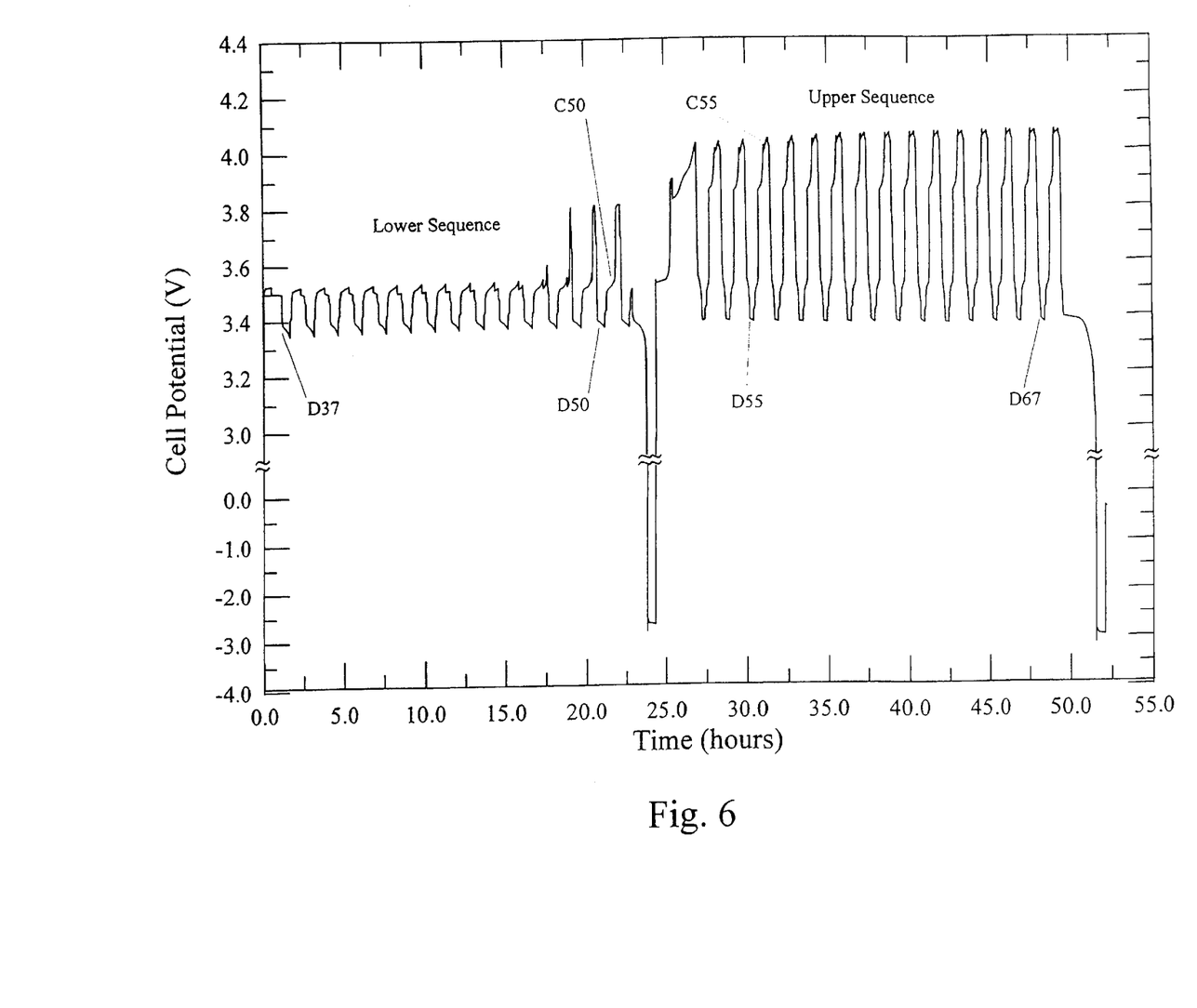
FIG. 6 is a graph showing the cell potential plotted versus time for a $Li/CuCl_2$ cell recycled to a depth of about 0.36 $e^-/CuCl_2$, using a two sequence cycling regime.

FIG. 6 depicts the cell potential as a function of time for the cell from Discharge 37 to Charge 67 at 27.8±2° C. for a depth of discharge of 0.36 $e^-/CuCl_2$ at 1.0 mA/cm² for a 1.5 hr/cycle test regime. The cell was charged for 35 min at 1.25 mA/cm² and then 15 min at 0.42 mA/cm². On Discharge 52 the cell was discharged to ~0.0 V then overdischarge in reversal at 0.40 mA/cm² for 0.10 $e^-/CuCl_2$ to a −2.67 V cut-off. The cell delivered 0.36 $e^-/CuCl_2$ on Discharges 37 to 67 at average discharge potentials of −3.37 V for all the discharges except Discharge 52.

The two sequence cycling regime used to cycle the cell of this example involved alternating between two sets of cycling conditions which have been designated as the "lower" and "upper" sequences as shown in FIG. 6. The "lower" cycling sequence consisted of a set of 15 cycles all with a charge capacity equivalent to 0.5 $e^-/CuCl_2$ followed by a full discharge to a 1.00 V cut-off which has been designated as a characterization discharge. For the "lower" cycling sequence the characterization discharge should deliver a discharge utilization of 0.50 $e^-/CuCl_2$ if the cell operated at a 100% Ahr efficiency. The characterization discharge provides a measure of the performance of the cell and could be used by a computer controlled charger to monitor the cells performance and to semi-optimize the charging conditions and the frequency of the deep discharges into reversal. For both the "upper" and "lower" sequences the 1.0 mA/cm constant current discharges were timed so that the discharge would end when a capacity of 0.30 $e^-/CuCl_2$ had been delivered. For the "upper" sequence the initial charge was for a capacity equivalent to 1.0 $e^-/CuCl_2$. The first 1.5 hr cycle then started with a 0.36 $CUCl_2$ discharge from approximately 1.0 to 0.60 $e^-/CuCl_2$ which is followed by a charge to 0.38 e$^-$/CuCl$_2$ (105% of the discharge) to approximately 1.0 e$^-$/CuCl$_2$. This cycling sequence was repeated for 15 cycles and then a full characterization discharge to a 1.00 V cut-off was carried out. The cell of this example delivered over 1000 discharges at 1.0 mA/cm$^2$ with capacities equivalent to 0.36 e$^-$/CuCl$_2$ (i.e. 9.43 mAhr) with average discharge potentials above 3.3 V using the two sequence cycling regime.

The two sequence cycling regime that was used to cycle the cell of this example improves performance for cells that are not cycled close to 100% depth of discharge by reducing capacity fluctuations, reducing the charge time, reducing the need for frequent overdischarges into reversal as well as increasing the reliability and cycle life of cells for the following reasons. First, the upper sequence permits the cell to be overcharged to produce Cl$_2$ and AlCl$_3$ to scavenge Li dendrites. Second, during the lower sequence in which the cell is not fully charged, the Li electrode is either fully discharged or is very close to being fully discharged and any Li metal dendrites in electrical contact with the Li negative electrode would be almost fully anodically dissolved. Thus, the cell is less likely to develop Li dendrite short circuits and is more reliable in terms of providing a higher cycle life without capacity fading and not venting due to Li dendrite initiated exothermic reactions between the Li dendrites and the electrolyte or other cell components.

The cell of this example was discharged to discharge cut-offs of above 3.00 V for most of the lower sequence discharges because it was necessary to complete the 0.36 e$^-$/CuCl$_2$ discharge and the charge in a total of 1.5 hrs. However, to improve the effectiveness of the Li dendrite scavenging reactions for other practical applications, such as those involving low temperature or very high rate charging, it is preferred that cells should be discharged to as close to 0.00 V as possible during the lower sequence of discharges using methods such as resistive loads as disclosed earlier.

For specific practical applications where cells are not fully discharged for a significant number of cycles, the two sequence cycling regime could be modified appropriately to adjust to the required depth of discharge, changes in the depth of discharge from cycle to cycle, changes in the amount of time or current for charging from cycle to cycle and changes in the amount of time available for deep discharge in reversal. Such changes in the cycling regime could be carried out most efficiently with a computer controlled charger and battery power supervision system with expert system software that is capable of analyzing cell and battery performance in real time. Such an expert system would be desirable for efficient commercial implementation of the methods of the invention for specific applications.

While the present invention has been described in conjunction with a preferred embodiment, one of ordinary skill, after reading the foregoing specification, will be able to effect various changes, substitutions of equivalents, and other alterations to the compositions and methods set forth herein. For example, changes may be made in cell construction and components, the depth of discharge, the frequency and the capacity of discharge in reversal, the current densities and other parameters of operating the cell without departing from the scope of the present invention. It is therefore intended that the protection granted by Letters Patent hereon be limited only by the definitions contained in the appended claims and equivalents thereof.

What is claimed is:

1. A rechargeable non-aqueous electrochemical cell comprising;

an alkali or alkaline earth metal negative electrode;

a metal halide, carbon or metal oxide positive electrode, said positive electrode material being admixed with at least 2 wt % of a carbonaceous conductive material;

a porous separator; and an SO$_2$ electrolyte solvent comprising a dissolved electrolyte salt capable of being oxidized to produce a halogen and/or a Lewis acid on overcharge or overdischarge with voltage reversal, wherein said negative electrode has an initial discharge capacity of not greater than 150% of the rechargeable coulombic capacity of the positive electrode and wherein all alkali or alkaline earth metal in said negative electrode can be anodically dissolved during discharge.

2. The electrochemical cell of claim 1 wherein said positive electrode is CuCl$_2$ or CuBr$_2$.

3. The electrochemical cell of claim 1 wherein said negative electrode comprises metallic lithium.

4. The electrochemical cell of claim 1 wherein said electrolyte salt is an aluminum halide salt.

5. The electrochemical cell of claim 1 wherein said electrolyte salt is a gallium halide salt.

6. The electrochemical cell of claim 1 wherein said negative electrode is lithium, said positive electrode is CuCl$_2$ admixed with at least 5 wt % carbon material and said electrolyte is LiAlCl$_4$ or LiGaCl$_4$ dissolved in SO$_2$.

7. A method of operating a rechargeable non-aqueous electrochemical cell, said cell comprising an alkali or alkaline earth metal negative electrode having an initial discharge capacity to a cell cut-off potential of 0.20 V of not greater than 150% of the positive electrode capacity, a positive electrode, a porous separator, and an SO$_2$ electrolyte solvent, comprising a dissolved electrolyte salt capable of being oxidized to produce a halogen and/or a Lewis acid on overcharge or overdischarge with voltage reversal, said method comprising the steps of:

(a) discharging said rechargeable cell to a sufficiently low positive potential approaching 0.00 V and for a sufficient time that said alkali or alkaline earth metal electrically connected to said negative electrode is at least 90% anodically dissolved; and (b) less frequently than performing step (a), overdischarging said rechargeable cell into reversal for a sufficient coulombic capacity to reduce the state of charge of the positive electrode with respect to the state of charge of the negative electrode.

8. The method of claim 7 wherein the said cell is overdischarged in reversal about every 4 to 50 discharges.

9. The method of claim 7 wherein the said cell is overdischarged in reversal for a capacity in reversal less than the theoretical capacity of the positive electrode.

10. The method of claim 7 wherein said cell is resistively discharged starting from about 1.5 V to 0.3 V with a discharge cutoff positive potential approaching 0.00 V.

11. The method of claim 7 wherein the said negative electrode is lithium and the capacity in reversal is from about 1 to 20% of the theoretical capacity of the positive electrode.

12. The method of claim 7 wherein said negative electrode comprises lithium and the current density during reversal is less than 1.0 mA/cm$^2$.

13. The method of claim 7 wherein said positive electrode is CuCl$_2$, CuBr$_2$ or NiCl$_2$.

14. The method of claim 7 wherein said electrolyte salt is an aluminum halide salt or a gallium chloride salt.

15. A method of operating a rechargeable non-aqueous electrochemical cell, said cell comprising a lithium-ion negative electrode having an initial discharge capacity to a cell cut-off potential of about 0.20 V of not greater than 150% of the positive electrode capacity, a positive electrode containing at least 2 wt % of a carbonaceous conductive additive, a porous separator and an $SO_2$ electrolyte solvent comprising a dissolved electrolyte salt comprising a lithium cation, wherein said salt is capable of being oxidized to produce a halogen and/or a Lewis acid on overcharge or overdischarge with voltage reversal, said method comprising the steps of:

(a) discharging said rechargeable cell to a sufficiently low positive potential approaching 0.00 V and for a sufficient time that lithium metal deposits or lithium dendrites electrically connected to said negative electrode are at least 90% anodically dissolved; and (b) less frequently than performing step (a), overdischarging said rechargeable cell into reversal for a sufficient coulombic capacity to reduce the state of charge of the positive electrode with respect to the state of charge of the negative electrode.

16. The method of claim 15 wherein the said electrolyte salt is an aluminum halide salt or a gallium halide salt.

17. The method of claim 15 wherein the said positive electrode is $CuCl_2$, $CuBr_2$ or $NiCl_2$.

18. The method of claim 15 wherein the said cell is resistively discharged starting from about 1.5 V to 0.3 V with a discharge cutoff positive potential approaching 0.00 V.

19. The method of claim 15 wherein the capacity passed during overdischarge in reversal is from about 0.2 to 20% of the theoretical capacity of the positive electrode.

20. The electrochemical cell of claim 1 wherein said negative electrode has an initial discharge capacity of not greater than 120% of the positive electrode capacity.

* * * * *

UNITED STATES PATENT AND TRADEMARK OFFICE
CERTIFICATE OF CORRECTION

PATENT NO. : 6,511,773 B1
DATED : January 28, 2003
INVENTOR(S) : Frederick W. Dampier It is certified that error appears in the above-identified patent and that said Letters Patent is hereby corrected as shown below:

Title page,
Item [56], References Cited, OTHER PUBLICATIONS, "Inorganic Electrolyte Li/CuC12 Rechargeable Cell" should read -- Inorganic Electrolyte Li/CuCl$_2$ Rechargeable Cell" --;

Column 11,
Line 28, "mA/cm" should read -- mA/cm$^2$ --;

Column 12,
Line 2, "MA/cm$^2$" should read -- mA/cm$^2$ --;
Line 44, "-3.37 V" should read -- ~3.37 V --;
Line 62, "mA/cm" should read -- mA/cm$^2$ --;
Line 67, "CUCl$_2$" should read -- CuCl$_2$ --.

Signed and Sealed this

Second Day of March, 2004

JON W. DUDAS
*Acting Director of the United States Patent and Trademark Office*